(12) United States Patent
Gastel

(10) Patent No.: US 8,551,593 B2
(45) Date of Patent: Oct. 8, 2013

(54) LAMINATED PRODUCT WITH AN ELECTRONIC IDENTIFICATION ELEMENT AND IDENTIFICATION AND FOLLOW-UP DEVICE FOR SAID PRODUCTS

(76) Inventor: Daniel André Gastel, Plaisir les Gatines (FR)

( * ) Notice: Subject to any disclaimer, the term of this patent is extended or adjusted under 35 U.S.C. 154(b) by 1559 days.

(21) Appl. No.: 10/553,622

(22) PCT Filed: Apr. 13, 2004

(86) PCT No.: PCT/FR2004/000907
§ 371 (c)(1), (2), (4) Date: Mar. 9, 2007

(87) PCT Pub. No.: WO2004/096537
PCT Pub. Date: Nov. 11, 2004

(65) Prior Publication Data
US 2008/0081141 A1    Apr. 3, 2008

(30) Foreign Application Priority Data
Apr. 23, 2003   (FR) ..................................... 03 04966

(51) Int. Cl.
*B32B 9/00*    (2006.01)

(52) U.S. Cl.
USPC ........ 428/40.1; 428/343; 428/354; 428/411.1; 428/43; 428/344; 403/390; 403/369; 403/365; 403/135; 403/243; 403/351; 384/602; 384/626

(58) Field of Classification Search
None
See application file for complete search history.

(56) References Cited

U.S. PATENT DOCUMENTS

| | | | | |
|---|---|---|---|---|
| 1,365,291 A | * | 1/1921 | Gray et al. | 384/626 |
| 1,951,730 A | * | 3/1934 | Johnson | 384/626 |
| 2,106,385 A | * | 1/1938 | Springer | 428/105 |
| 4,526,641 A | | 7/1985 | Schriever et al. | |
| 5,767,789 A | * | 6/1998 | Afzali-Ardakani et al. | 340/10.1 |
| 6,100,804 A | * | 8/2000 | Brady et al. | 340/572.7 |
| 6,207,004 B1 | * | 3/2001 | Murasawa | 156/300 |
| 6,294,997 B1 | * | 9/2001 | Paratore et al. | 340/572.1 |
| 6,448,886 B2 | * | 9/2002 | Garber et al. | 340/10.1 |
| 6,482,287 B1 | | 11/2002 | De Gaulle | |
| 2005/0079782 A1 | * | 4/2005 | Gastel | 442/149 |
| 2008/0000567 A1 | * | 1/2008 | Gastel | 156/62.2 |

FOREIGN PATENT DOCUMENTS

| EP | 667 233 | 8/1995 |
| FR | 2 697 801 | 5/1994 |
| FR | 2 800 186 | 4/2001 |
| FR | 2 812 126 | 1/2002 |

OTHER PUBLICATIONS

Brochure titled "Peelable Shims", JICEY precision shims, pulication date not available.*
Bbrochure titled "New X-Fiber® The High-Resistance Composite Material", publication date not available.*

* cited by examiner

*Primary Examiner* — Gerard T. Higgins
*Assistant Examiner* — Anish Desai
(74) *Attorney, Agent, or Firm* — Leydig, Voit & Mayer, Ltd.

(57) ABSTRACT

A laminated product having a thickness that can be adjusted by chipping, and including alternating sheets and layers of an adhesive material in a stack, each sheet possessing an intrinsic resistance to tearing and each layer of adhesive material connecting adjacent sheets in the stack with a linking force which is weaker than the resistance of the sheets to tearing, enabling each sheet to be detached from the stack without tearing. The product includes a housing which is disposed inside the thickness of the stack, and an electronic identification element which is disposed in the housing.

19 Claims, 2 Drawing Sheets

Figure 4:
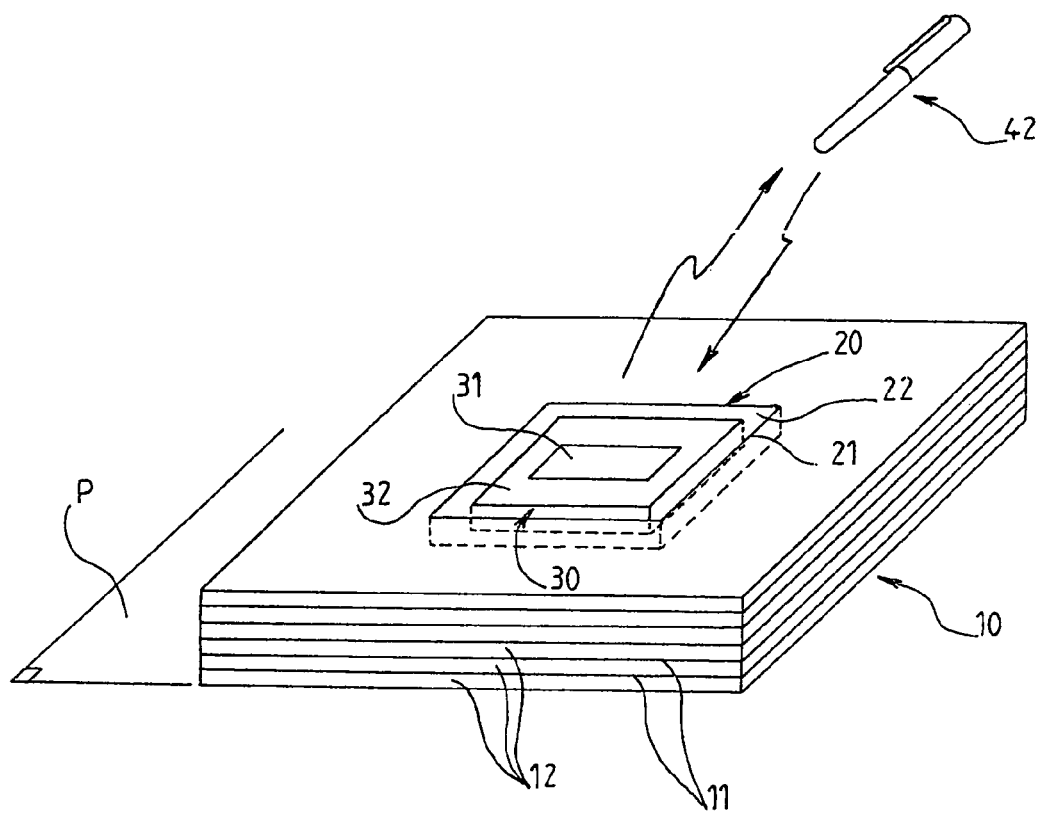

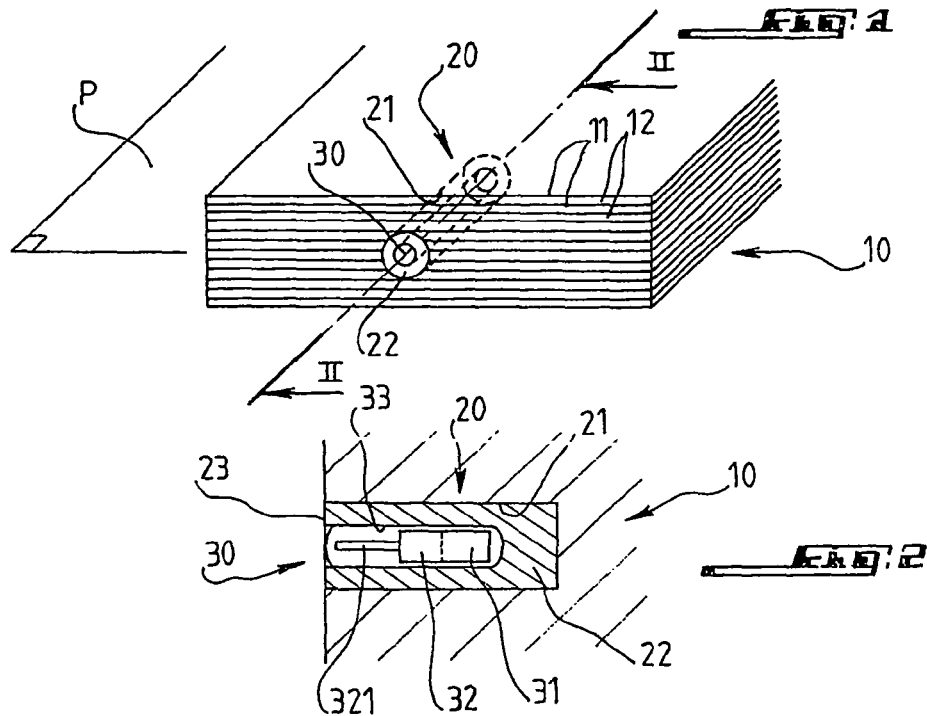
Fig. 1
Fig. 2
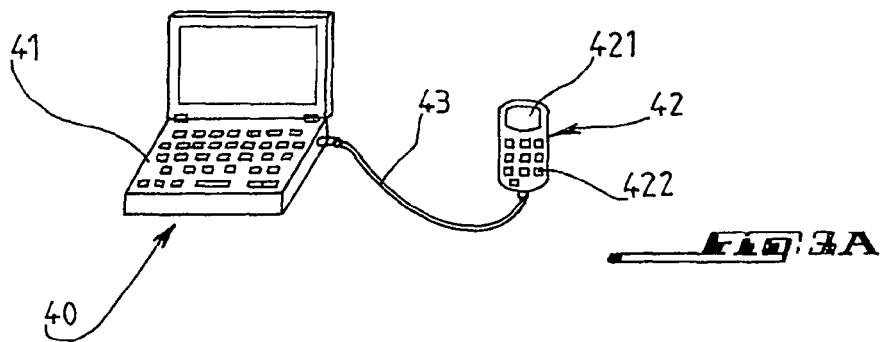
Fig. 3A
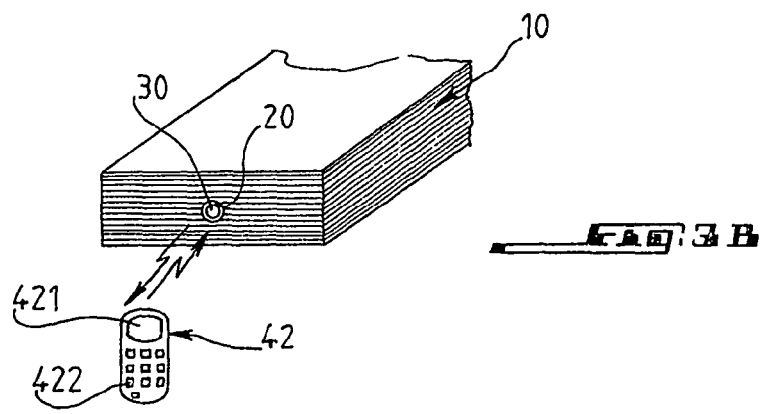
Fig. 3B

LAMINATED PRODUCT WITH AN ELECTRONIC IDENTIFICATION ELEMENT AND IDENTIFICATION AND FOLLOW-UP DEVICE FOR SAID PRODUCTS

FIELD OF THE INVENTION

The invention relates in general to laminated products and the monitoring of these products.

More precisely, according to a first aspect, the invention relates to a laminated product whose thickness can be adjusted by exfoliation, this product having an alternating stack of sheets and layers of an adhesive material, each sheet having an intrinsic resistance to tearing, and each layer of adhesive material connecting two adjacent sheets of the stack to one another by a bonding force which is less than the resistance of the sheets to tearing, from which it results that each sheet can be detached from the stack without being torn.

BACKGROUND

Products of this type are known in prior art and are used in particular as adjustment shims for mechanical assemblies. These assemblies generally have extensive play at certain points, resulting from the combination of manufacturing tolerances. This play is compensated for by insertion of shims.

The thickness of these shims is adjusted by removing the upper or lower sheets one by one until the desired thickness is reached.

These shims are used in particular in industries in which the complete traceability of all the parts is required for reasons of safety or quality assessment. This is the case, for example, in aeronautics. Each part constituting an aircraft is numbered, and a quality assessment file is associated with it containing the manufacturing plans or at least their references, the materials certificates, the references of the manufacturing specifications, etc.

The serial numbers of the peelable shims are generally marked in indelible ink by a stamp on the upper side of the shim at the time of manufacturing.

This technique has a number of defects.

The upper sheets of the shim bearing the serial number are removed during the operation of adjustment of the thickness of the shim. Once this operation is done, the shim can no longer be identified. It can be lost or interchanged by mistake with another one between the time its thickness is adjusted and the time it is positioned.

Furthermore, the marking is difficult to read on certain types of shims such as, for example, shims made of composite material, which have a surface which is unsuitable for stamping, smooth or hatched depending on the materials.

Finally, since the shims are generally small in size, the volume of information that can be marked on the shim is very small. It is generally limited to the serial number of the shim.

SUMMARY OF THE INVENTION

In this context, the present invention aims to palliate the defects mentioned above.

For this purpose, the product of the invention comprises a housing in the thickness of a stack, and an electronic identification component arranged in the housing.

In a possible embodiment of the invention, the electronic component has a memory for storage of identification information identifying or characterizing the product, and a transmission device that can be queried at a distance and is capable of transmitting the identification information stored in the memory.

Advantageously, the identification information stored in the memory includes at least the serial number of the product.

Preferably, the memory has a large storage capacity, sufficient for storing at least a major part of the identification information such as: identification of the manufacturer of the product, type of product, reference of the order, identification of the client, identification of the material constituting the product and reference of the material certificate, reference of the standard applicable to the manufacturing of the product, reference of the technical specifications of the product, reference of the certificate of compliance with standards, manufacturing date, reference of the delivery voucher, delivery date.

For example, the memory has a storage capacity of at least 512 bits.

Advantageously, certain identification information is stored in the memory in coded form.

Preferably, the transmission device is capable of receiving identification information at a distance and of writing it in the memory.

For example, the electronic component can be locked in terms of writing.

Advantageously, the electronic component has the general shape of a cylinder whose exterior diameter is less than 4 mm.

Preferably, the electronic component has some means for measurement of temperature and/or of pressure and/or of vibrations and/or of irradiation, the transmission device being capable of transmitting the results of the measurements made by the means.

For example, the electronic identification component has a very small thickness, the memory having sufficient storage capacity for storing the essential identification information, the other information being stored on an external support.

Advantageously, the electronic identification component has a thickness less than 200 μm.

Preferably, the electronic identification component has a cross section less than 2.5 $mm^2$.

For example, the memory has a capacity greater than 64 bits.

Advantageously, the electronic component can be used in read mode alone.

Preferably, the housing is delimited by an interior wall, with a hardening filling material filling the housing around the electronic component and connecting it to the interior wall.

For example, the filling material is a resin, for example, an epoxy, phenolic, vinyl ester or polyvinyl resin.

Advantageously, the sheets consist of a metallic or composite material.

Preferably, the sheets all extend parallel to a plane of reference, the housing also extending parallel to the plane of reference.

According to a second aspect, the invention relates to a device for identification and monitoring of laminated products as described above, and comprising a reading unit which communicates with the transmission device of the electronic component, the reading unit being capable of consulting the identification information stored in the memory.

For example, the reading unit is portable and communicates at a distance, without a wire link, with the electronic component.

Advantageously, the device has an information processing unit for management of the identification information, the reading unit being capable of transmitting the information read in the memory to the information processing unit.

Preferably, the reading unit is capable of transmitting to the electronic component the identification information managed by the information processing unit, for writing in the memory.

For example, the information processing unit carries out the coding and decoding of certain identification information stored in coded form in the memory.

Advantageously, the coding and decoding of the identification information are done using tables putting in correspondence the information to be coded and an alphanumeric code to be stored in the memory.

Finally, according to a third aspect, the invention relates to the application of a laminated product as described above to a peelable adjustment shim for mechanical assemblies.

BRIEF DESCRIPTION OF DRAWING FIGURES

Other characteristics and advantages of the invention will emerge clearly from the description given for it below on an indicative and non-limiting basis, in reference to the appended figures among which:

FIG. 1 is a perspective view of a laminated product according to a first embodiment of the invention, FIG. 2 is a view in cross section of the electronic identification component according to arrows II of FIG. 1, FIGS. 3A and 3B are simplified diagrams of a device for monitoring of the products of the invention, respectively showing the reading unit communicating with the information processing unit, and the reading unit communicating with the electronic identification component, and FIG. 4 is a view equivalent to FIG. 1, in the case of a second embodiment of the invention.

DETAILED DESCRIPTION

FIG. 1 represents a laminated product whose thickness can be adjusted by exfoliation, the thickness being the vertical dimension of the product as represented in FIG. 1.

This product has alternating stack 10 of sheets 11 and layers 12 of an adhesive material. The product is prepared using thin sheets 11 whose thickness generally varies between 0.1 and 0.01 mm. These sheets 11 are coated with an extremely thin film of adhesive material, on the order of 0.002 mm, and are stacked. Stacked sheets 11 then undergo a treatment consisting of applying a very high pressure to them while subjecting them to prolonged heating cycles. The thickness of layers 12 of adhesive material is even smaller after treatment, this thickness becoming barely measurable, Each sheet 11 has an intrinsic resistance to tearing, and each layer of adhesive material 12 connects two adjacent sheets 11 of stack 10 to one another by a bonding force which is less than the resistance of sheets 11 to tearing. Consequently, each sheet 11 can be detached from stack 10 without being torn. A cutter is generally used for detaching sheets 11.

According to the invention, the product has housing 20 provided within the thickness of stack 10, and electronic identification component 30 arranged in housing 20.

Electronic component 30, ordinarily called a chip, has memory 31 for storage of identification information identifying or characterizing the product, and transmission device 32 that can be queried at a distance and is capable of transmitting the identification information stored in memory 31.

This identification information includes at least the serial number of the product.

According to a first embodiment of the invention, illustrated in FIGS. 1 to 3A/3B, memory 31 has a large storage capacity, sufficient for storing at least a major part of the following information: identification of the manufacturer of the product, type of product, serial number of the product, reference of the order, identification of the client, identification of the material constituting the product and reference of the material certificate, reference of the standard applicable to the manufacturing of the product, reference of the technical specifications of the product, reference of the certificate of compliance with standards, manufacturing date, reference of the delivery voucher, delivery date.

Memory 31 has a storage capacity of at least 512 bits, and preferably 1024 bits, allowing 108 alphanumeric characters to be stored.

This capacity is sufficient to store all of the information listed above. Certain identification information is stored in memory 31 in coded form as will be seen further on.

This list is not limiting, and other information can also be stored in memory 31, within the limit of its storage capacity. This other information can also replace certain information listed above.

Transmission device 32 is furthermore capable of receiving identification information at a distance and of transmitting it to memory 31 that stores it.

Electronic component 30 can be locked in terms of writing.

Electronic component 30 is represented in FIG. 2. It has the general shape of a cylinder, with an exterior diameter less than 4 mm. This cylinder can typically have a length of 13.3 mm and an exterior diameter of 3.15 mm.

Transmission device 32 has copper coil 321 functioning as an antenna, which is electrically connected to memory 31.

Memory 31 and transmission device 32 are arranged inside sealed cylindrical glass envelope 33. Antenna 321 of transmission device 32 occupies an axial end of envelope 33.

Electronic component 30 typically functions at a frequency of 125 kHz.

As can be seen in FIG. 1, sheets 11 all extend parallel to a plane of reference P, represented to be horizontal in FIG. 1. Housing 20 preferably extends parallel to the plane of reference P, occupying the smallest possible thickness of the product.

This housing 20 is cylindrical and blind and opens through open end 23 onto a lateral surface of the product. It can be produced very simply, for example, using a drilling machine.

It has an interior diameter slightly greater than the exterior diameter of envelope 33 of electronic component 30.

Electronic component 30 is arranged in housing 20, the axis of symmetry of electronic component 30 being parallel to the axis of symmetry of housing 20. Antenna 321 of transmission device 32 is arranged on the side of open end 23 of housing 20.

Housing 20 is delimited by interior wall 21, a hard filling material 22 filling housing 20 around electronic component 30 and connecting it to interior wall 21.

This filling material 22 is typically resin, for example, of the epoxy, phenolic, vinyl ester or polyvinyl type.

The invention also relates to a device for identification and monitoring of laminated products provided with an electronic identification component such as that described above.

Device 40 has information processing unit 41 for management of the identification information, and reading unit 42 communicating with information processing unit 41 and with transmission device 32 of electronic component 30.

Reading unit 42 is capable of consulting the identification information stored in memory 31 and of transmitting it to information processing unit 41. To do this, it queries electronic device 30 by sending a signal to transmission device 32, this device transmitting the identification information stored in memory 31 to reading unit 42.

Reading unit 42 is also capable of transmitting to electronic component 30 the identification information managed by information processing unit 41, for writing in memory 31, by the intermediary of transmission device 32.

Information processing unit 41 is a microcomputer equipped with database management software.

This software is programmed in such a way as to present the user of the device with predetermined data entry forms containing fields corresponding to the identification information stored in memory 31.

The information present in the form of an alphanumeric code is stored in this form in memory 31. This information is typically: serial number of the product, reference of the order, reference of the material certificate, reference of the technical specifications of the product, reference of the certificate of compliance with standards, manufacturing date, reference of the delivery voucher, delivery date.

Other information is stored in memory 31 in coded form, because it would occupy too much room in memory 31 in its usual form or because it is present in unsuitable forms. This information is typically: identification of the manufacturer of the product, type of product, identification of the client, identification of the material constituting the product and reference of the standard applicable to the manufacturing of the product.

Information processing unit 41 carries out the coding and decoding of the identification information stored in coded form in memory 31.

The coding and decoding are done using tables included in the software, putting in correspondence the information to be coded and an alphanumeric code to be stored in the memory.

Reading unit 42 is portable, lightweight, small in size, and can be transported easily by the user.

This unit has a buffer memory for storage of the identification information, display screen 421, and control device 422.

The buffer memory makes it possible to temporarily store the identification information read in memory 31 of electronic component 30, or the identification information to be written in memory 31 of electronic component 30.

Screen 421 makes it possible to display certain identification information and to display parameters concerning the functioning of reading unit 42.

Control device 422 is preferably a keyboard and makes it possible to trigger the reading of the identification information in memory 31 of electronic component 30, the writing of this information in memory 31 and the locking in terms of writing of electronic component 30.

Reading unit 42 communicates at a distance, without a wire link, with electronic component 30, as shown by FIG. 3B.

The information is transmitted between reading unit 42 and electronic component 30 by waves or by optical means. For this purpose, reading unit 42 has transmission means cooperating with transmission device 32 of electronic component 30.

In an execution variant, reading unit 42 and electronic component 30 can communicate by optical fibers.

The range of the transmission is short, which limits interferences with other electronic systems in the vicinity. Reading unit 42 must be arranged a distance of one to ten centimeters from electronic component 30 during communications.

Reading unit 42 communicates with information processing unit 41, for example, by removable wire link. For this purpose, identification device 40 has cable 43 of type RS232, reading unit 42 and information processing unit 41 having respective ports of type RS232 to which the ends of cable 43 are connected by suitable plugs. Reading unit 42 can also communicate with information processing unit 41 by optical link or any other suitable type of link.

This wire link ensures the transfer of the identification information between the buffer memory of reading unit 42 and information processing unit 41.

The "marking" procedure for identification of a laminated product is the following.

1/ Introduction of electronic component 30 into housing 20 of the product.

2/ Filling of housing 20 with filling material 22, hardening.

3/ Introduction by a user of the identification information into the database of information processing unit 41, by entering the information in the different headings of the form provided for this purpose.

4/ Connection of reading unit 42 to information processing unit 41, by connection of connecting cable 43 in the corresponding ports of these units.

5/ Coding of certain identification information by information processing unit 41, and transfer of all the identification information into the buffer memory of reading unit 42.

6/ Disconnection of connecting cable 43.

7/ Manual transfer by the user of reading unit 42 to the vicinity of the product.

8/ Transfer of the identification information from the buffer memory of reading unit 42 into electronic component 30 and writing of the information in memory 31, as ordered by the user.

9/ Locking in terms of writing of electronic component 30, as ordered by the user.

The procedure for reading of the identification information is the following.

1/ Manual transfer by the user of reading unit 42 to the vicinity of the product.

2/ Reading of the identification information in memory 31 of electronic component 30, as ordered by the user, and transfer of the information into the buffer memory of reading unit 42.

3/ Manual transfer by the user of reading unit 42 to the vicinity of information processing unit 41.

4/ Connection of reading unit 42 to information processing unit 41, by connection of connecting cable 43 in the corresponding ports of these units. 5/ Transfer of the identification information from the buffer memory of reading unit 42 into information processing unit 41, as ordered by the user from information processing unit 41.

6/ Decoding of the identification information by information processing unit 41.

7/ Display of the identification information by the user using the forms provided in the database.

The product can be manufactured with sheets 11 made of metallic or composite material. In the case in which sheets 11 are metallic, particular precautions must be taken in order to guarantee the quality of the communication between electronic component 30 and reading unit 42.

Antenna 321 of transmission device 32 of electronic component 30 in this case is arranged in the immediate vicinity of open end 23 of housing 20. Furthermore, the interior diameter of housing 20 is chosen to be sufficiently large relative to the exterior diameter of envelope 33 of electronic component 30. A minimum separation, for example, 0.5 mm, is maintained between electronic component 30 and interior wall 21 of housing 20.

In an execution variant, electronic component 30 can have some means for measurement of the ambient temperature, of pressure exerted on the product, of vibrations or of irradiation. The measurement results are transmitted by transmission device 32 to reading unit 42 which in turn transmits them to information processing unit 41.

A second embodiment of the invention is represented in FIG. 4. Only the differences with respect to the first embodiment will be described below, the elements which are identical or which have the same function in both embodiments keeping the same references.

In the second embodiment, electronic identification component 30 has a very small thickness, memory 31 having a limited storage capacity relative to the first embodiment but sufficient to store the essential identification information, the other information being stored on an external support.

Thus, electronic identification component 30 has a thickness less than 200 μm and preferably less than 150 μm.

Electronic identification component 30 is present in the form of a rectangular parallelepiped, with a cross section less than 2.5 mm² in a plane perpendicular to the thickness. This cross section is typically a square section, 1.3 mm on a side.

Electronic identification component 30 has a silicon chip whose size corresponds approximately to that of component 30, carrying an antenna on one of its two large sides constituting transmission device 32. Antenna 32 consists of a metallic micro-wire spirally wound on the large side of the chip, in such a way that this antenna has a thickness of only 20 μm. The pitch of the winding is approximately 10 μm. A very thin layer of polyamide protects the antenna from mechanical impacts. Component 30 functions at a frequency of approximately 15.56 MHz.

Memory 31 has a capacity greater than or equal to 64 bits. It generally only contains the serial number of the product. The other information for identification of the product can be consulted in the quality assessment file associated with the product or is stored in digital form in an external memory, for example, a CD-ROM.

Knowledge of the serial number of the product enables one to find the file or access the information stored in the external memory.

Electronic component 30 can be used in reading alone. The serial number of the product is written in memory 31 using a special known device, before electronic component 30 is arranged and secured in housing 20.

Housing 20 in which electronic component 30 is arranged has a shape corresponding to the shape of this component, that is to say parallelipipedic.

Housing 20 is hollowed on an upper or lower side of the product. It extends parallel to plane P in such a way that the product is only hollowed over a very small thickness corresponding to the thickness of electronic component 30.

As in the first embodiment, electronic component 30 is secured in housing 20 by epoxy resin.

The side of electronic component 30 carrying antenna 32 is arranged on the open side of housing 20.

The identification information stored in memory 31 is read using known reading unit 42, present in the form of a pen.

This pen contains a buffer memory in which the serial number read in memory 31 of the electronic component is stored.

This number is displayed directly on a display component of the pen. In an execution variant, this number is displayed using a known reader to which the pen is connected.

In an execution variant which is not represented, housing 20 is not hollowed in the upper surface or in the lower surface of the product but rather in a lateral surface.

It is therefore understood that the invention makes it possible to identify laminated products in a reliable and lasting manner without risk of loss of information when the upper or lower layers of the product are peeled in order to adjust its thickness.

In the first embodiment of the invention, a large number of information items can be stored in the electronic component and therefore can be physically associated with the laminated product continually, which was not previously possible.

This information remains continually readable and accessible even after the product has been inserted in a mechanical assembly.

On the other hand, this embodiment can only be used for products with a sufficient thickness.

The second embodiment of the invention is suitable rather for laminated products of small thickness because of the extreme thinness of the electronic component. On the other hand, a smaller number of identification information items can be stored in memory.

Of course, the execution examples mentioned here are not limiting, and it is indeed understood that it is possible to choose the type and size of the identification component as a function of the thickness of the laminated product so as to obtain the best memory capacity/space requirement compromise. In any case, laminated products equipped with identification components combining a large storage capacity and a very small thickness are also included in the scope covered by the invention.

Furthermore, the identification means of the invention is inviolable and unfalsifiable. The electronic components cannot be extracted from the housings when the filling material has been put in place and set. To extract the identification means, it would be necessary to destroy the shim or the electronic component itself. In addition, the electronic components can be locked in terms of writing or can only be used in reading alone.

Frauds concerning the origin of laminated products are therefore made much more difficult or even impossible in the case of the first embodiment since all the data allowing identification of the product are continually accessible and are unfalsifiable.

It should be noted that the laminated products described above are quite suitable for being used as peelable shims in order to take up the play in mechanical assemblies, particularly in the aeronautics industry in which all the parts are the object of very thorough monitoring and quality assessment.

The invention claimed is:

1. A laminated adjustment shim for compensation of play in a mechanical assembly, the shim having a thickness adjustable by exfoliation and including:
    a stack of alternating sheets and layers of an adhesive material, each sheet having resistance to tearing, and each layer of adhesive material connecting two adjacent sheets of the stack to one another by a bonding force which is less than the resistance of the sheets to tearing, so that each sheet can be detached from the stack without being torn;
    a blind housing located within the thickness of the stack, the housing having an opening at a surface of the shim; and
    an electronic identification component located in the housing.

2. The shim according to claim 1, wherein the electronic identification component includes
    a memory having identification information stored thereon for identifying the shim, and
    a transmission device that can be remotely queried to transmit the identification information stored in the memory.

3. The shim according to claim 2, wherein the identification information stored in the memory includes at least a serial number of the shim.

4. The shim according to claim 2, wherein the identification information stored in the memory includes at least one of: identification of manufacturer of the shim, reference of an order for the shim, identification of client, identification of material constituting the shim, reference of a standard applicable to manufacturing of the shim, reference of technical specifications of the shim, reference of certificate of compliance with the standard, manufacturing date, reference of a delivery voucher of the shim, or delivery date of the shim.

5. The shim according to claim 1, wherein the blind housing is defined by an interior wall of the stack, and including a filling material in the blind housing, embedding the electronic component and bonding the electronic component to the interior wall.

6. The shim according to claim 5, wherein the filling material is selected from the group consisting of an epoxy resin, a phenolic resin, a vinyl ester resin, and a polyvinyl resin.

7. The shim according to claim 1, wherein the sheets consist of a metallic or composite material.

8. The shim according to claim 1, wherein the sheets extend parallel to a plane of reference, and the blind housing extends parallel to the plane of reference.

9. The shim according to claim 2, wherein the memory has storage capacity for storing a first portion of the identification information, and
a second portion of the identification information being stored on an external support.

10. The shim according to claim 9, wherein the electronic identification component has a thickness less than 200 µm.

11. The shim according to claim 9, wherein the electronic identification component has a cross sectional area less than 2.5 mm$^2$.

12. The shim according to claim 9, wherein the electronic component has a read-only mode.

13. The shim according to claim 4, wherein a portion of the identification information is stored in the memory in coded form.

14. The shim according to claim 4, wherein the transmission device received the identification information remotely and wrote the identification information in the memory.

15. Theme shim according to claim 14, wherein the electronic component can be locked in terms of writing.

16. Theme shim according to claim 4, wherein the electronic component has a cylindrical shape with an exterior diameter of less than 4 mm.

17. The shim according to claim 4, wherein the electronic component includes means for measurement of at least one of temperature, pressure, vibrations, and irradiation, and the transmission device transmits measurements made by the means for measurement.

18. A laminated adjustment shim comprising:
a stack of alternating sheets and layers of an adhesive material, wherein
the sheets extend in a first direction, and
the stack extends in a perpendicular to the first direction that defines a thickness of the stack;
a blind housing within the thickness of the stack and extending in the first direction, the blind housing comprising an opening at a surface of the shim;
an electronic component within the blind housing and comprising
a memory having identification information of the shim,
a transmission device coupled to the memory that can be remotely queried to transmit the identification information stored in the memory, and
an antenna coupled to the transmission device and located proximate the opening at the surface of the shim;
wherein the memory and the transmission device are arranged inside a sealed cylindrical glass envelope.

19. The shim according to claim 18, wherein the memory stores the identification information including at least one of identification of manufacturer of the shim, reference of an order for the shim, identification of client, identification of material constituting the shim, reference of a standard applicable to manufacturing of the shim, reference of technical specifications of the shim, reference of certificate of compliance with the standard, manufacturing date of the shim, reference of a delivery voucher of the shim, or delivery date of the shim.

* * * * *